Aug. 29, 1950 G. L. FERNSLER 2,520,595
VISUAL INDICATOR OF DISTANCE BETWEEN TWO POINTS
AND THE BEARING OF A LINE CONNECTING THEM
Filed Feb. 27, 1948 2 Sheets-Sheet 1
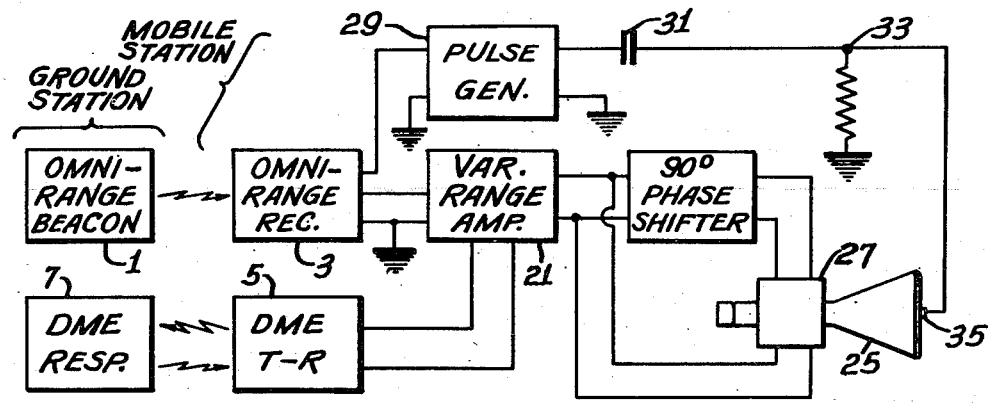
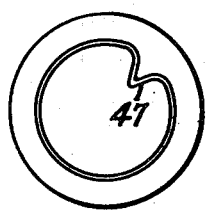
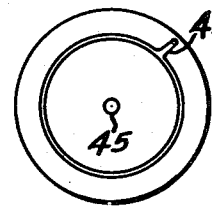
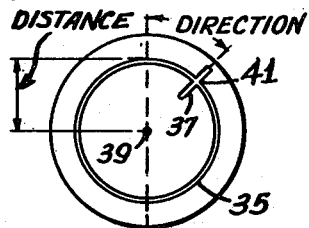
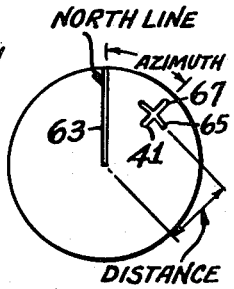
Fig. 5  Fig. 6  Fig. 2  Fig. 4
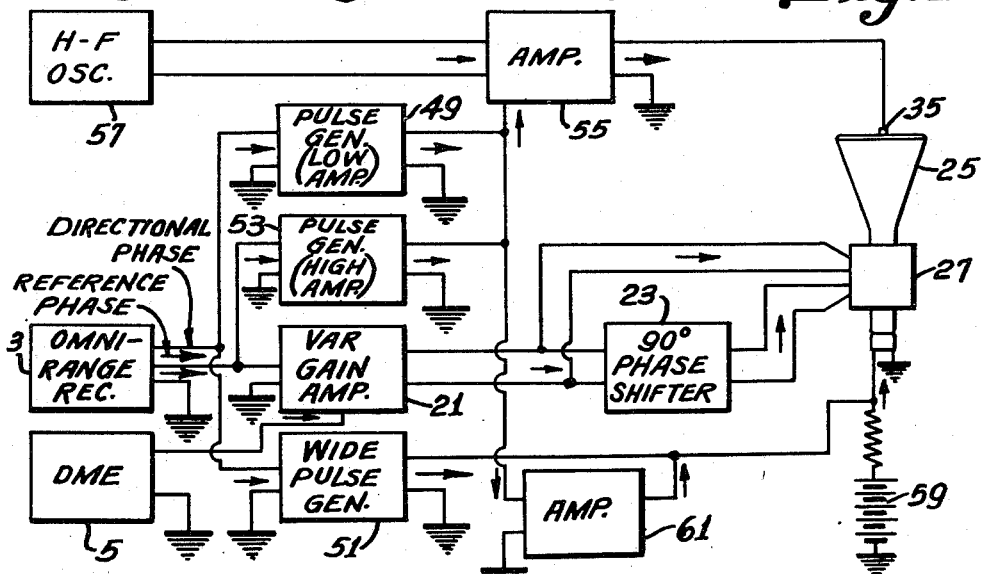
Fig. 3
Inventor
George L. Fernsler
By J. L. Whittaker
Attorney Patented Aug. 29, 1950

2,520,595

UNITED STATES PATENT OFFICE 2,520,595

VISUAL INDICATOR OF DISTANCE BETWEEN TWO POINTS AND THE BEARING OF A LINE CONNECTING THEM

George L. Fernsler, Lawrenceville, N. J., assignor to Radio Corporation of America, a corporation of Delaware Application February 27, 1948, Serial No. 11,421

6 Claims. (Cl. 343—6)

This invention relates to position indicator systems, and its principal object is to provide improved methods and means for producing a map-like visual display showing the distance and direction of a mobile craft from a reference point or ground station.

More specifically, it is an object of the present invention to provide means controlling a cathode ray oscilloscope tube, in response to direction information derived from an omnidirectional radio range system and distance information derived from radio distance measuring equipment, to produce a composite display showing both distance and direction in a simple, readily interpretable form.

Figure 7:
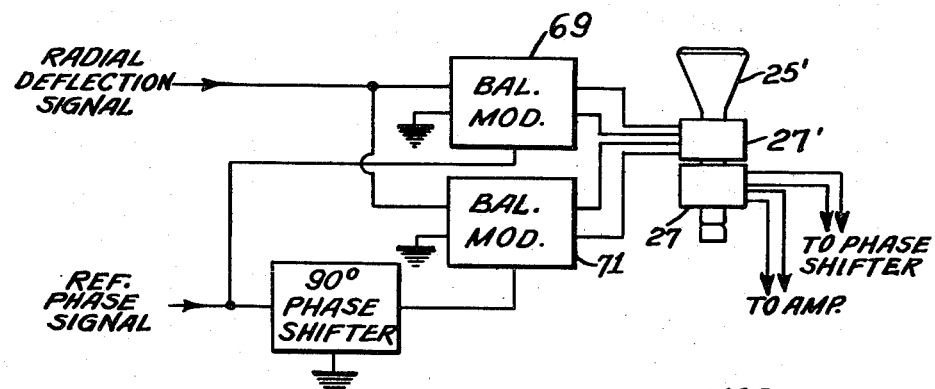
Figure 8:
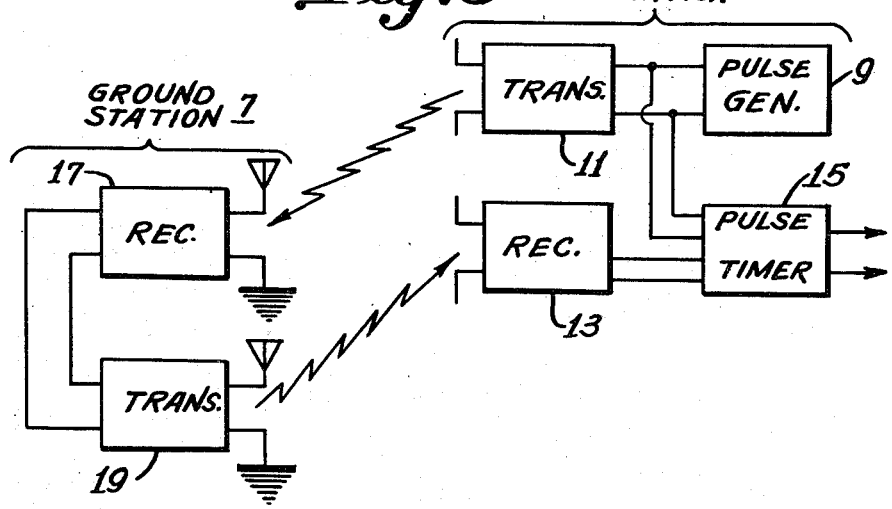

The invention will be described with reference to the accompanying drawings, wherein:

Figure 1 is a schematic block diagram of a radio position indicator system embodying the invention, Figure 2 shows a typical display produced by the system of Figure 1, Figure 3 is a schematic block diagram of a system like that of Figure 1 but including additional means to provide a directional reference line and a modified positional indication, Figure 4 shows the type of indication produced by the system of Figure 3, Figures 5 and 6 show alternative displays which can be produced by either of the systems of Figure 1 or Figure 3 with a conventional type cathode ray tube, Figure 7 shows a modified cathode ray deflection arrangement which may be substituted for those shown in Figures 1 and 3, and Figure 8 is a schematic block diagram of a pulse echo radio distance measuring system suitable for use with the systems of Figures 1 and 3.

In the presently preferred form of the invention directional information is provided at the mobile craft by an omnidirectional radio range of the type described in United States Patent No. 2,253,958. The range includes, at a ground station or reference point, a beacon 1. A range receiver 3 is carried by a mobile craft. The beacon 1 radiates two signals: one which varies in some characteristic, such as phase, in accordance with the direction from the beacon, and another which does not vary but serves as a reference for comparison with the first. These signals are received, converted to a common frequency, and delivered at separate output terminals by the receiver 3.

Distance from the mobile station to the ground station may be measured by a pulse echo system comprising a transmitter-receiver device 5 on the craft and a second transmitter-receiver combination 7 at the ground station. Referring to Figure 8, the mobile equipment includes a pulse generator 9, a transmitter 11 modulated by the generator 9, a receiver 13, and a pulse interval timer 15 connected to the receiver 13 and the pulse generator 9. The ground based portion of the distance measuring equipment may be simply a receiver 17 which responds to signals from the transmitter 11 and a transmitter 19 which is modulated by the output of the receiver 17. The mobile receiver 13 responds to the transmitter 19.

Systems of the type shown in Figure 8 are known in the radar art as DME (distance measuring equipment). In operation, each pulse from the generator 9 is applied directly to the interval timer 15 and simultaneously transmitted by the transmitter 11. The ground station equipment 7 "responds," i. e. relays the pulse back to the receiver 13. The received pulse, as applied to the interval timer 15, is delayed with respect to the original pulse by an amount proportional to the distance between the ground station and the mobile station. The interval timer, which may include an Eccles-Jordan circuit or similar device, provides a D.-C. output whose magnitude is proportional to the pulse delay and hence to the distance.

Returning to Figure 1, the reference phase output of the range receiver 3 is applied, through an amplifier 21, to the beam deflection system of a cathode ray oscilloscope tube 25. In the present example, the beam deflection means includes a deflection yoke 27 which comprises two windings for producing respectively horizontal and vertical deflection. The output of the amplifier 21 is applied directly to one of said windings, and through a 90 degree phase shifter 23 to the other winding. The amplifier 21 is designed in known manner to have its gain varied by means of a control voltage. The control voltage in this case is the output of the distance measuring equipment 5.

The directional phase output of the range receiver 3 is applied to a pulse generator 29, which may be a wave shape modification circuit for changing a sine wave into a pulse train, or a pulse oscillator which is synchronized by the directional phase signal. The output of the pulse generator 29 is applied, through a differentiating circuit comprising a capacitor 31 and a resistor 33, to means for deflecting radially the beam of the cathode ray tube 25. In the system illustrated, the tube 25 is of the type which includes a radial deflection electrode connected to a terminal 35.

The operation of the system of Figure 1 is as follows: The reference phase signal from the range receiver 3 energizes the horizontal and vertical deflection coils of the yoke 27 in quadrature, causing the cathode ray beam in the tube 25 to trace a circular path on the screen. The luminous circle produced by the beam has a radius which is controlled by the distance measuring equipment 5, and is proportional to the distance of the mobile craft from the ground station.

The pulse generator 29 provides a brief pulse once during each cycle of the directional phase output of the range receiver 3. This pulse has a definite time relationship with the sine wave from which it is derived; for example, the pulse may be produced at each positive-going crossover, i. e. every time the instantaneous magnitude of the directional phase signal is zero and changing from negative to positive polarity. The differentiating network 31, 33 converts the pulse to a sharp diphasic spike, comprising a positive-going portion and a negative going portion, one closely following the other. The differentiated pulse drives the cathode ray beam in the tube 25 radially outward and inward from its circular path, drawing a luminous line on the screen.

The angular position of this line with respect to a reference, such as the vertical deflection axis of the tube 25, depends upon the phase relationship between the reference phase signal and the directional phase signal, and thus is an indication of the direction of the mobile station from the ground station. The resulting display is shown in Figure 2, where the circular trace 35 is that produced by the reference phase signal and controlled by the distance measuring equipment, and the radial trace 37 is that produced by the differentiated pulse from the generator 29. The position of the ground station is represented by the deflection center, at the point 39, and the position of the mobile station is indicated by the intersection 41 of the circle 35 and the line 37. Since the radial deflection electrode of the tube 25 is incapable of swinging the cathode ray beam past the control axis of the tube, the inner end of the line 37 will be at the point 39, providing the amplitude of the output of the pulse generator 29 is made sufficiently large.

A modified type of indication may be obtained by omitting the differentiating network 31, 33 from the system of Figure 1. This will cause the cathode ray beam to be driven radially outward or inward from the circular trace, depending upon the polarity of the pulses from the generator 29. Figure 6 shows the direction indication provided by driving the beam outward, comprising a line 43. The deflection center may be marked by periodically turning off the circular deflection means, for example by keying the receiver 3 or the transmitter 1. This will result in a luminous spot 45 at the position representing the ground station.

The display shown in Figure 5 is the result of deflecting the beam inward from the circular trace. In this form of indication, as well as in that of Figure 6, the pulse generator 29 may if desired be arranged to generate a somewhat longer pulse, providing a notch-shaped mark. It should be evident that the use of a narrow pulse of proper polarity will produce an inwardly directed single line instead of the notch 47.

The system of Figure 3 is similar in some respects to that of Figure 1, and corresponding elements are designated by the same reference characters. The reference phase channel includes the amplifier 21 and 90 degrees phase shifter 23 connected to the deflection yoke 27 as in Figure 1. The directional phase output of the range receiver 3 is applied both to a narrow pulse generator 49, which is similar in function to the generator 29 of Figure 1 but provides an output of relatively low amplitude, and to a second pulse generator 51 which produces a relatively wide pulse. Either or both of the pulse generators 49 and 51 may include phase shift means if necessary to make the narrow pulse from the generator 49 occur at the center of the wide pulse from the generator 51.

A third pulse generator 53, designed like the generator 49 to provide a narrow pulse, but of considerably greater amplitude than that produced by the generator 49, is controlled by the reference phase output of the range receiver 3. The output circuits of the narrow pulse generators 49 and 53 are tied together, and in the present example are conected to an amplifier 55 in such manner as to control the gain of said amplifier. The amplifier 55 is normally biased off; a low amplitude pulse from the generator 49 causes it to amplify with relatively low gain, and a high amplitude pulse from the generator 53 provides a relatively high gain. The input circuit of the amplifier 55 is connected to a high frequency oscillator 57. Output from the amplifier 55 goes to the radial deflection electrode terminal 35 on the tube 25.

As an alternative to the above described arrangement, the outputs of the pulse generators 49 and 53 may be applied directly to the terminal 35 through a differentiating network like the network 31, 33 of Figure 1.

The beam intensity control electrode of the tube 25 is biased to normally cut off the beam, by means of a source 59 such as a battery. The output of the wide pulse generator is applied to said electrode in such polarity as to overcome the bias and turn on the beam. In addition, the output of the narrow pulse generator 53 is applied to beam intensity control electrode by way of an amplifier 61. The amplifier 61 is included primarily to prevent the pulse generator 51 from keying the amplifier 55.

In the operation of the system of Figure 3, the cathode ray beam is normally cut off, so that although the circular deflection signals are present, no luminous circular trace is produced. The high amplitude pulse generator 53 produces a pulse at some predetermined part, such as the positive-going crossover of each cycle of the reference phase signal. This pulse makes the amplifier 55 operate momentarily at high gain, and at the same time overcomes the bias from the source 59 and turns on the cathode ray beam. The result is a radial luminous trace which remains at the same angular position on the screen, regardless of variations in the position of the mobile station. Figure 4 shows the radial line 63, which may conveniently represent the north direction from the ground station.

At a predetermined part of each directional phase cycle, for example, the positive-going crossover, the low amplitude pulse generator 49 turns on the amplifier 55 at low gain for a brief period. The wide pulse generator 51 also provides a pulse which starts shortly before the narrow pulse from the amplifier 49, and ends shortly after the narrow pulse. The wide pulse turns on the cathode ray long enough to draw a short luminous arc 65 (see Figure 4) on the screen. Approximately at the center of the arc 65, the output of the amplifier 55 drives the cathode ray in and out over a short distance, drawing a radial line 67.

The arc 65 and the line 67 intersect at the point 41 which corresponds to the position of the mobile station. It will be evident to those skilled in the art that the cross-like indication 65, 67 may be used without the reference line 63, or the north line may be used with an indication like any of those shown in Figures 2, 5 or 6.

The above described systems involve the use of a cathode ray tube having a radial deflection electrode. The present is not limited thereto; other known methods of producing radial deflection may be substituted. For example, a cathode ray tube without a radial deflection electrode may be used with an auxiliary deflection yoke, as shown in Figure 7.

The cathode ray tube 25' is provided with the same yoke 27 as used in the systems of Figures 1 and 3, and a second yoke 27' similar to the yoke 27. The horizontal and vertical deflection windings of the yoke 27' are connected to balanced modulators 69 and 71. The radial deflection signal (i. e. the output of the pulse generator 29 or the amplifier 55) is applied to both modulators 69 and 71. The reference phase signal from the range receiver is applied directly to the modulator 69, and through a 90 degree phase shifter 73 to the modulator 71.

In the intervals between the radial deflection pulses, both modulators 69 and 71 are cut off and provide no output. The cathode ray beam is swept in a circular path by the yoke 27. When a radial deflection pulse occurs, the cathode ray beam is driven from its current position on the circular path in a direction which depends upon the relative energization of the horizontal and vertical deflection coils of the yoke 27'. The amplitude of the output of the modulator 69 is proportional to the instantaneous magnitude of the sine-wave reference phase signal. The amplitude of the output of the modulator 71 is similarly proportional to the instantaneous magnitude of the corresponding cosine wave. Thus the direction of the deflection of the cathode ray beam from its circular path will be radial, producing substantially the same final effect as the systems of Figures 1 and 3.

The invention has been described as an improved position indicator system for mobile craft, using a cathode ray tube with its beam deflected so as to trace a circular path on the long persistent luminescent screen. The radius of the path is controlled in accordance with the distance of the craft from a reference point. The beam is deflected radially from the circular path, at a point corresponding in angular position to the direction of the craft from the reference point. The resulting display provides a readily interpretable visual indication, wherein the position of the craft is indicated by the intersection of the circle and the radial line.

I claim as my invention:

1. An indicator system for visually representing information as to the position of an object with respect both to a reference point and to a reference line including means for supplying two wave trains having a phase relationship depending on the azimuth angle between the reference line and a straight line passing through the object and the reference point, means for supplying a voltage having a characteristic which is proportional to the distance between said object and said reference point, a cathode ray oscilloscope, means responsive to one of said wave trains to provide deflection signals for deflecting the cathode ray beam of the oscilloscope to trace a circular path, means responsive to said voltage to control the amplitude of said deflection signals so that said circular path has a radius proportional to said distance, means including pulse generators responsive to said wave trains respectively to provide corresponding trains of pulses, means for applying one of said trains of pulses to the oscilloscope to deflect said beam along a linear path which is substantially radial to said circular path to produce a visual representation of said reference line and means for applying the other of said trains of pulses to deflect said beam along a linear path which is substantially radial to said circular path to produce a visual representation of said straight line.

2. An indicator system as set forth in claim 1 including means normally biasing off the cathode beam of said oscilloscope, and means momentarily overcoming the bias during each of the pulses of said one of said trains thereof and during periods which start before and end after each of the pulses of said other train thereof.

3. An indicator system for visually representing information as to the position of an object with respect both to a reference point and to a reference line including means for supplying two wave trains having a phase relationship depending on the azimuth angle between the reference line and a straight line passing through the object and the reference point, means for supplying a voltage having a characteristic which is proportional to the distance between said object and said reference point, a cathode ray oscilloscope, means responsive to one of said wave trains to provide deflection signals for deflecting the cathode ray beam thereof to trace a circular path, said last-mentioned means including an amplifier responsive to said voltage to control the amplitude of said deflection signals so that said circular path has a radius proportional to said distance, a pulse generator responsive to the other of said wave trains to generate a corresponding train of relatively short pulses, means for applying the train of pulses to the oscilloscope periodically to deflect said beam along a linear path which is substantially radial to said circular path thereby to produce a visual representation of said straight line, means for producing a representation of said reference line which representation is viewable along with said last-mentioned visual representation, and means for controlling the intensity of the cathode ray beam in said oscilloscope including a second pulse generator also responsive to said other wave train but arranged so that a corresponding train of pulses which it generates are relatively wide and a connection for applying the wide pulses to the oscilloscope.

4. In a radio system for obtaining and visually representing information as to the position of an object both with respect to a reference point and to a reference line in which the system includes omnidirectional radio range means for supplying two wave trains having a phase relationship depending on the azimuth angle between the reference line and a straight line passing through the object and the reference point and distance measuring equipment for supplying a voltage having a characteristic proportional to the distance between said object and said reference point, a unitary indicator system including a cathode ray oscilloscope, means providing deflection signals for deflecting the cathode ray beam of the oscilloscope to trace a circular path, means responsive to said voltage supplied by the distance measuring equipment to control the amplitude of said deflection signals so that said circular path has a radius proportional to said distance, means periodically operative to deflect said beam momentarily along a linear path which is radial to said circular path, means responsive to said two wave trains according to the phase relationship between them to control the direction of said radial deflection so that the angle between it and a predetermined radius from the center of said circular path will be equal to the angle between said straight line and said reference line, whereby said cathode ray tube produces a visual display comprising a circular trace and a radial trace intersecting it at a point whose distance from the center of the circular trace represents said distance between the object and said reference point and whose angular displacement along said circular trace from said predetermined radius represents said azimuth angle.

5. In a radio system for obtaining and visually representing information as to the position of a craft both with respect to a reference point and to a reference line in which the system includes omnidirectional radio range means for supplying two wave trains having a phase relationship depending on the azimuth angle between the reference line and a straight line passing through the position of the craft and the reference point, and distance measuring equipment for supplying a voltage having a characteristic proportional to the distance between said craft and said reference point, a position indicator system including a cathode ray oscilloscope, means responsive to one of said wave trains to provide deflection signals for deflecting the cathode ray beam of the oscilloscope to trace a circular path, said last-mentioned means including an amplifier and means responsive to said voltage supplied by the distance measuring equipment to control the gain of said amplifier and thus the amplitude of said deflection signals so that said circular path has a radius proportional to said distance, means including a pulse generator periodically operative in response to the other of said wave trains to deflect said beam momentarily along a linear path which is radial to said circular path to produce a visual representation of said straight line, and means for producing a representation of said reference line which representation is viewable along with said last-mentioned representation, whereby said cathode ray oscilloscope provides a visual display comprising a circular trace and a radial trace intersecting it at a point whose distance from the center of the circular trace represents said first-mentioned distance and whose angular displacement along said circular trace from said representation of said reference line represents said azimuth angle.

6. An indicator system for visually representing information as to the position of a given point with respect both to a reference point and to a reference line such as north including means for supplying two wave trains having a phase relationship depending on the azimuth angle between the reference line and a straight line passing through said given point and said reference point, means supplying a voltage having a characteristic proportional to the distance between said given point and said reference point, a cathode ray oscilloscope, means responsive to one of said wave trains to provide deflection signals for deflecting the cathode ray beam of the oscilloscope to trace a circular path on its screen, means responsive to said voltage to control the amplitude of said deflection signals so that said circular path has a radius proportional to said distance, means responsive to one of said wave trains for periodically deflecting said beam along a linear path which is substantially radial to said circular path and in a direction representing said reference line, and means responsive to the other of said wave trains for periodically deflecting said beam along a linear path which is also substantially radial to said circular path and is in a direction related angularly to said first-mentioned direction in accordance with said phase relationship.

GEORGE L. FERNSLER.

REFERENCES CITED

The following references are of record in the file of this patent:

UNITED STATES PATENTS

| Number | Name | Date |
|---|---|---|
| 2,253,958 | Luck | Aug. 26, 1941 |
| 2,406,858 | Shepherd et al. | Sept. 3, 1946 |
| 2,422,697 | Meacham | June 24, 1947 |
| 2,432,330 | Norgaard | Dec. 9, 1947 |
| 2,449,982 | De Rosa | Sept. 28, 1948 |